United States Patent
Mohan

(10) Patent No.: US 7,502,568 B1
(45) Date of Patent: Mar. 10, 2009

(54) METHOD OF USING LOW BANDWIDTH SENSOR FOR MEASURING HIGH FREQUENCY AC MODULATION AMPLITUDE

(75) Inventor: Jitendra Mohan, Santa Clara, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 513 days.

(21) Appl. No.: 10/728,065

(22) Filed: Dec. 4, 2003

(51) Int. Cl.
*H04B 10/00* (2006.01)
(52) U.S. Cl. ............... 398/197; 398/195; 398/198
(58) Field of Classification Search ............... 398/25, 398/33, 38, 151, 171, 182–201
See application file for complete search history.

(56) References Cited

U.S. PATENT DOCUMENTS

| | | | |
|---|---|---|---|
| 5,850,409 A * | 12/1998 | Link | 372/38.01 |
| 6,064,238 A * | 5/2000 | Wight et al. | 327/58 |
| 6,327,064 B1 * | 12/2001 | Zhu | 398/196 |
| 6,822,987 B2 * | 11/2004 | Diaz et al. | 372/38.02 |
| 7,019,883 B2 | 3/2006 | Moon et al. | |
| 7,065,303 B1 * | 6/2006 | Kerem | 398/197 |
| 7,106,969 B1 * | 9/2006 | Lichtman et al. | 398/59 |
| 2003/0108071 A1 | 6/2003 | Hedin et al. | |
| 2003/0175037 A1 * | 9/2003 | Kimmitt et al. | 398/198 |
| 2003/0219050 A1 | 11/2003 | Couch | |
| 2004/0022285 A1 * | 2/2004 | Romm | 372/38.02 |

* cited by examiner

Primary Examiner—Agustin Bello

(57) ABSTRACT

A slow monitor diode having a bandwidth only partially overlapping a lower end of a data transmission spectrum for a data transmission laser is employed to detect and control average output power of the data transmission laser and, from peak-to-peak measurements, optical modulation amplitude. The output current from the monitor diode reaches a peak value for long runs of consecutive logical 1's or 0's. Using peak detectors with a long decay rate, the peak-to-peak signal amplitude, directly representative of optical modulation amplitude, may be determined.

20 Claims, 4 Drawing Sheets

A: (549,953p 457,467m)  delta: (-28,5293p -884.429m)
B: (521.424p -426,962m)  slope: 31.0228G A: (3.81912u 470.916m)  delta: (159.625n - 934.323m)
B: (3.97875u -463.407m)  slope: -5.85324M

METHOD OF USING LOW BANDWIDTH SENSOR FOR MEASURING HIGH FREQUENCY AC MODULATION AMPLITUDE

TECHNICAL FIELD OF THE INVENTION

The present invention is directed, in general, to output power control for optical data transmission sources and, more specifically, to output power monitoring configurations for data transmission lasers.

BACKGROUND OF THE INVENTION

Data transmission over an optical medium such as an optical fiber typically requires use of a laser classified by the limit imposed on output power (and the corresponding danger associated with use of such output power), with many systems employing, for instance, a Class 2 laser. Accordingly, the output power of lasers employed must satisfy stringent eye safety requirements and equally stringent requirements defined by the transmission protocol (e.g., Ethernet, fiber channel, etc.).

Conventional optical power control schemes employ a p-type/intrinsic/n-type (PIN) semiconductor light detection monitor diode and a partially reflective lens to monitor the output of a vertical cavity surface emitting laser (VCSEL) or other light source. A small fraction of the light emitted by the laser is reflected to the PIN diode, which converts the light to an electrical current sensed by a transimpedance amplifier for conversion into a voltage. The voltage representative of the reflected light is compared against a reference voltage and an error signal generated on the basis of that comparison is employed to servo the VCSEL light output power to desired level.

High bandwidth or full bandwidth monitor diodes add significant expense to the cost of an optical transmission source. In addition, precision alignment of the light source, partially reflective lens, and monitor diode is required for high bandwidth monitor diodes.

There is, therefore, a need in the art for a less expensive monitor diode configuration.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

To address the above-discussed deficiencies of the prior art, it is a primary object of the present invention to provide, for use in an optical subassembly for network transmission of data over an optical fiber from a computer, determination of output power of light emitted from a data transmission light source based for use in controlling average power and either extinction ratio (ER) or optical modulation amplitude (OMA) with an inexpensive PIN monitor diode.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the detailed description below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller might be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

FIGS. 1 through 3E, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
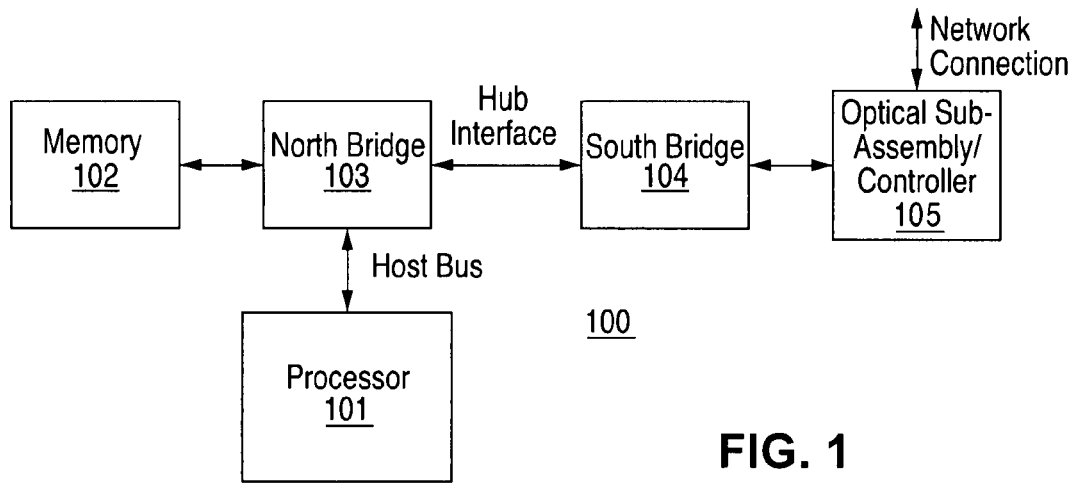
FIG. 1 depicts a computer implementing prediction and control of optical modulation amplitude and/or extinction ratio for an optical sub-assembly therein according to one embodiment of the present invention.

FIG. 1 depicts a computer implementing prediction and control of optical modulation amplitude and/or extinction ratio for an optical sub-assembly therein according to one embodiment of the present invention. Those skilled in the art will recognize that the full construction and operation of a mobile computer is not depicted and described. Instead, for simplicity and clarity, only so much of a mobile computer as is unique to the present invention or necessary for an understanding of the present invention is depicted or described.

Computer 100 includes a processor 101, main memory 102, and bridges 103 and 104 enabling the processor 101 to interface with other system elements. Processor 101 employs a memory controller host or "north bridge" 103 to interface with main memory 102 and graphics units (not shown). Processor 101 employs an interface controller host or "south bridge" 104, coupled to the north bridge 103 by a hub interface, to interface with other devices over standard, general-purpose buses such as a Peripheral Component Interconnect (PCI) bus.

In the present invention, south bridge 104 is coupled (using, for instance, a card mounted within a PCI bus slot) to an optical sub-assembly (OSA) 105 including an optical transceiver and a controller (not shown) providing a network connection over an optical medium, such as an Ethernet network connection over optical fiber(s). Control of the optical transmission power for optical sub-assembly 105 is based on optical modulation amplitude or extinction ratio in the manner described in further detail below.

In describing the scheme for control over extinction ratio according to the present invention, the following values are employed: $P_o$ represents the instantaneous VCSEL output power; $P_{avg}$ represents the time-averaged (low pass filtered) value of output power $P_o$; I represents VCSEL current; $I_1$ represents logical "1" ("on") level current and $I_0$ represents logical "0" ("off") level current, which typically is not zero; $I_{avg}$ represents average VCSEL current calculated from $I_{avg}=(I_1+I_0)/2$; $I_{th}$ represents threshold current; $I_{mod}$ represents modulation current calculated from $I_{mod}=I_1-I_0$; $\eta$ represents slope efficiency; ER=10 $\log(P_1/P_0)$ represents extinction ratio; OMA=$(P_1-P_0)$ represents optical modulation amplitude, more commonly employed in current control systems than ER; and $T_n$ denotes sampling time.

The power output of a VCSEL is given by:

$$P_O = (I-I_{th}) \cdot \eta, \text{ and}$$

$$P_{avg} = (I_{avg}-I_{th}) \cdot \eta.$$

Assuming that two samples of average power $P_{avg}(T_1)$ and $P_{avg}(T_2)$ are taken, and further assuming that the threshold current $I_{th}$ and slope efficiency $\eta$ remain constant across those measurements, the expression above for average power may be written as:

$$P_{avg}(T_1) = (I_{avg}(T_1)-I_{th}) \cdot \eta, \text{ and}$$

$$P_{avg}(T_2) = (I_{avg}(T_2)-I_{th}) \cdot \eta.$$

Solving these equations for the two desired variables:

$$I_{th} = \frac{P_{avg}(T_1) \cdot I_{avg}(T_2) - P_{avg}(T_2) \cdot I_{avg}(T_1)}{P_{avg}(T_1) - P_{avg}(T_2)}, \quad (1)$$

$$\eta = \frac{P_{avg}(T_1) - P_{avg}(T_2)}{I_{avg}(T_1) - I_{avg}(T_2)}. \quad (2)$$

The average power and average current will depend on the logical data value being transmitted at times $T_1$ and $T_2$. The exemplary embodiment of the present invention utilizes equations (1) and (2) above in real time control of both the average power and extinction ratio. Since average power monitoring is being performed in real time, with the results fed back to control the bias current $I_{bias}$ and modulation current $I_{mod}$, by using two appropriate samples of average power one parameter (e.g. slope efficiency) may be very closely approximated while the other parameter (threshold current in this example) is precisely known from the two measurements.

Figure 2:
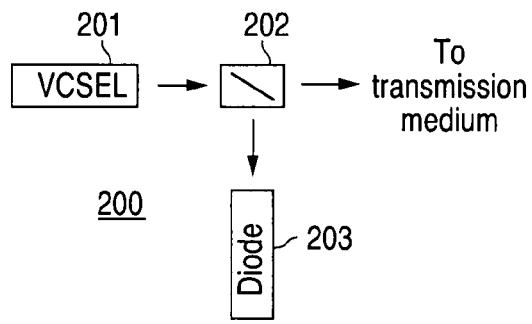
FIG. 2 depicts a low bandwidth diode optical monitor configuration for determining average output power according to an embodiment of the present invention.

FIG. 2 depicts a low bandwidth diode optical monitor configuration for determining average output power according to another embodiment of the present invention. As noted above, a common configuration 200 for measuring output power involves passing the light emitted by VCSEL 201 through a complex lens 202 passing most of the light through to the transmission medium (not shown) but reflecting a portion onto a monitor diode 203.

In current systems, the PIN monitor diode 202 is typically either slow and used to control average power only, causing extinction ratio and optical modulation amplitude to vary with operating conditions, or a very expensive full bandwidth PIN diode that more accurately monitors transmitted light. In the present invention, low bandwidth PIN diodes are employed to collect the power measurements required to estimate and control extinction ratio or optical modulation amplitude. Such low bandwidth PIN diodes are less expensive.

Accordingly, monitor diode 203 is an inexpensive PIN diode with low bandwidth, employed to extract information about light modulation including average output power measurements employed to control both average power $P_{avg}$ and extinction ratio or optical modulation amplitude. As long as the monitor diode has sufficient bandwidth to overlap the lower end of the transmitted spectrum (with a bandwidth of about 10% frequency of the emitted light being sufficient), the output current from the monitor diode 203 will reach the peak value for long run lengths (e.g., long runs of consecutive logical 1's). Therefore, by monitoring the peak-to-peak value of the output from monitor diode 203 using a peak detector, optical modulation amplitude may be estimated. In other words, the output eye of the monitor diode 203 will be completely closed due to intersymbol interference (ISI), but the peak-to-peak value is a true (and direct) representation of the VCSEL output optical modulation amplitude.

Figure 3A:
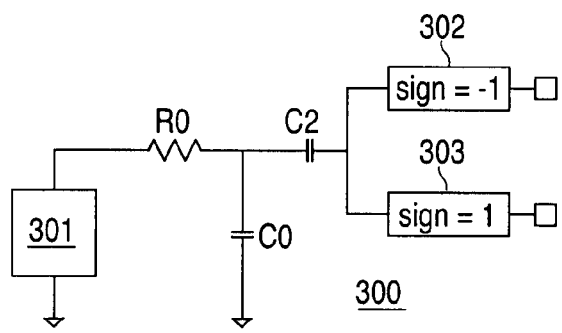
FIGS. 3A through 3E illustrate simulation results for operation of a low-bandwidth diode optical monitor configuration for determining average output power according to one embodiment of the present invention.

FIGS. 3A through 3E illustrate simulation results for operation of a low-bandwidth diode optical monitor configuration for determining average output power according to one embodiment of the present invention. FIG. 3A depicts the equivalent circuit 300 employed for simulation, in which the signal source 301 generating 1.25 giga-bits per second (Gbps) data at various amplitudes is coupled to a low pass filter ($R_0$ and $C_0$) approximating the bandwidth of an inexpensive, low frequency PIN sensor diode. The output of the filter is coupled by alternating current (AC) coupling capacitor $C_2$ to peak detectors 302-303 detecting upper and lower signal peaks for the output of the low pass filter.

Figure 3B:
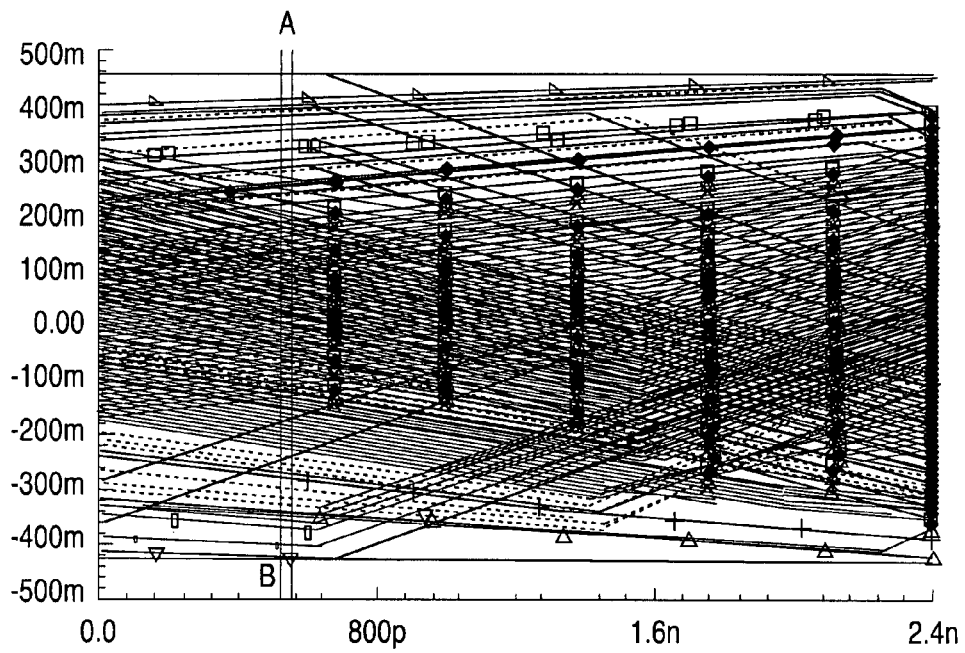
Figure 3C:
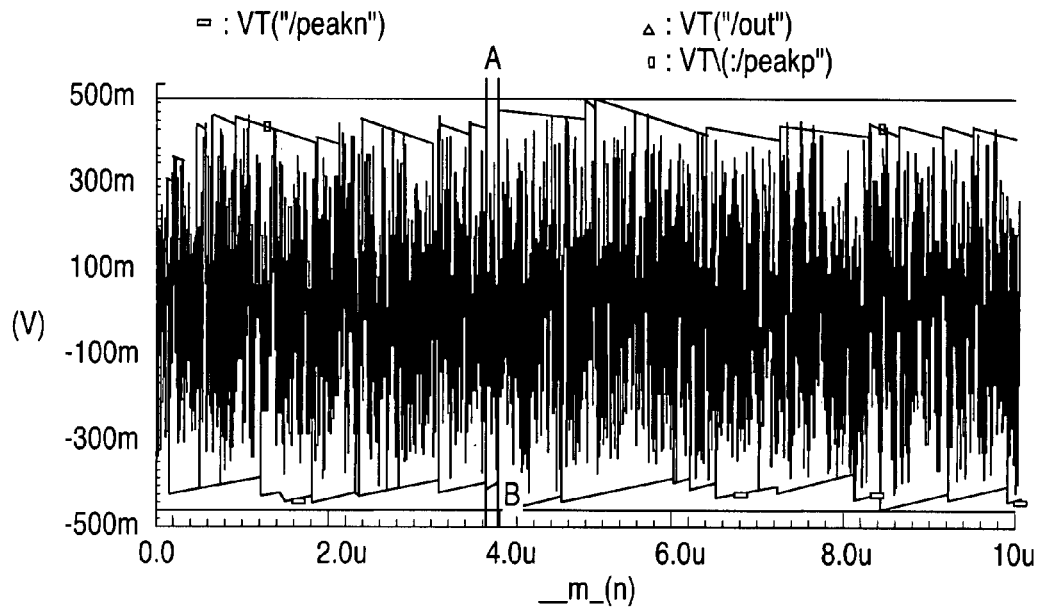

FIG. 3B is the output eye diagram for the sensor, using a 1 volt peak-to-peak input signal at 1.25 Gbps and a 50 mega-Hertz (MHz) low pass filter. A 30-50 MHz low pass filter is preferable, since above 50 MHz the response becomes a function of bandwidth. The eye in FIG. 3B is completely closed, but the peak-to-peak amplitude of the eye is close to the peak-to-peak amplitude of the transmitted signal, even though the sensor bandwidth is less than a tenth of the data rate. FIG. 3C depicts the same data plotted in FIG. 3B superimposed with peak detector outputs with an exponential decay at a rate of 100 kilo-Hertz (KHz), a decay rate selected to be much lower than the low frequency content of the input data.

Figure 3D:
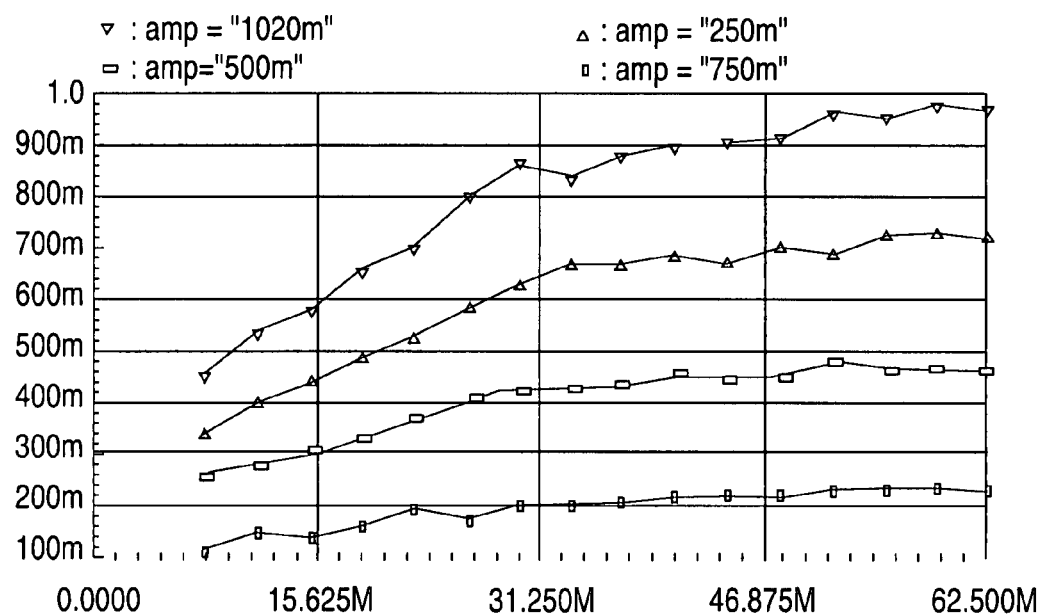
Figure 3E:
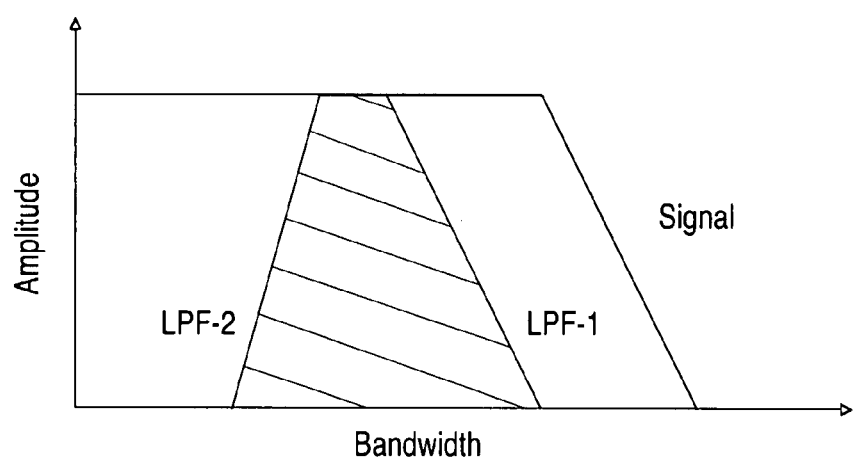

FIG. 3D illustrates results of a parametric simulation varying 1.25 Gbps input data amplitude over four different levels (0.25 V, 0.5 V, 0.75 V and 1.0 V) and sensor bandwidth over 16 linear steps (from 7.8125 MHz to 62.5 MHz). The results suggest that the peak-to-peak output of a low frequency sensor is a good representation of the peak-to-peak input signal amplitude. As the sensor bandwidth is varied, the peak-to-peak output goes through two fairly linear slopes: at very low sensor bandwidths (less than $1/40^{th}$ of the data rate), the sensitivity is higher than at higher sensor bandwidth, resulting from roll-off in the spectrum of the input signal. Once the input spectrum begins to fall, signal power in the combined spectrum (both signal and low pass filter) reduces at twice the rate, resulting from roll-off due to the low pass filter nature of the signal and the high pass filter nature of the signal. This roll-off is depicted in FIG. 3E, where signal LPF-1 (the middle sloped line and the horizontal line connecting that line to the ordinate) covers the signal spectrum such that power rolls off due to a single pole (the low pass filter) as sensor bandwidth is reduced, while signal LPF-2 (bordering the cross-hatched area) covers the signal spectrum such that power rolls off due to two poles (one due to the sensor low pass filter and the other due to the high pass filter of the signal spectrum, depicted by darker lines).

The present invention allows precise control over average power output for a light source in a data transmission system based on power measurements, while estimating and controlling either extinction ratio or optical modulation amplitude. In one embodiment, peak-to-peak measurements from a low bandwidth monitor diode directly indicate optical modulation amplitude.

Figure 4:
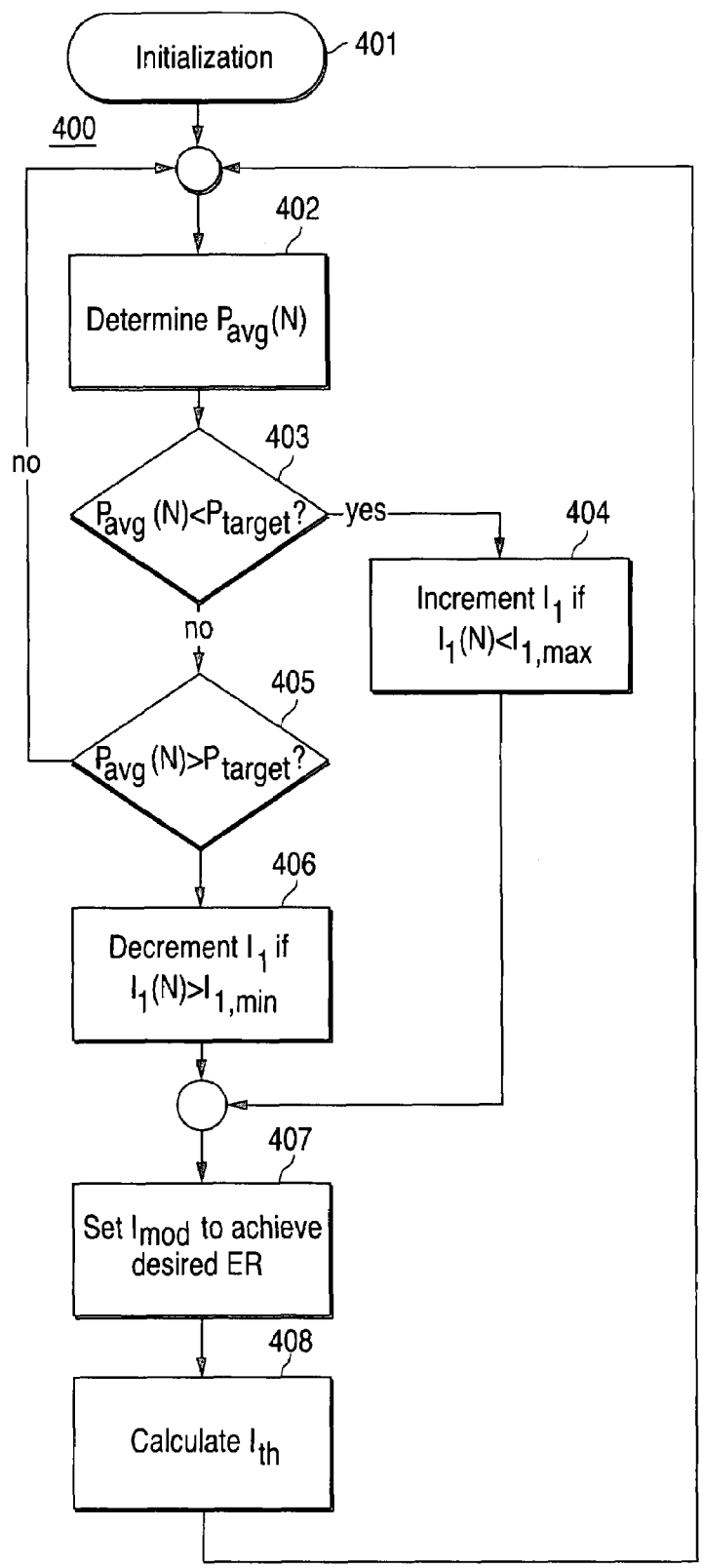
FIG. 4 is a high level flowchart illustrating a process of controlling optical modulation amplitude and/or extinction ratio for an optical sub-assembly according to one embodiment of the present invention.

FIG. 4 is a high level flowchart illustrating a process of controlling optical modulation amplitude and/or extinction ratio for an optical sub-assembly according to one embodiment of the present invention. In the example depicted and described, average power is controlled by varying $I_1$ and extinction ratio is controlled by varying $I_{mod}$. In an alternative embodiment, the dependence of optical modulation amplitude on the modulation current $I_{mod}$ could be determined from the equations given above, and controlled in lieu of extinction ratio.

The process 400 begins by initialization of $I_1=I_{1,min}$, $I_{mod}=0$ and $I_{th}=I_{th,min}$ (step 401). Next, an average output power sample $P_{avg}(N)$ is determined (step 402) from, for example, electrical characteristics of the VCSEL or the output signal from a low bandwidth monitor diode. The average power measurement $P_{avg}(N)$ is compared to a target value $P_{target}$ to determine if the average power measurement is less than the target (step 403). If so, the present logical 1 level current $I_1$ (the maximum current driven through the VCSEL) is incremented (step 404), provided the maximum operating limit set for that parameter $I_{1,max}$ (e.g., the maximum current that the VCSEL can tolerate) has not previously been reached. If not, however, the average power measurement $P_{avg}(N)$ is compared to a target value $P_{target}$ to determine if the average power measurement exceeds or is greater than the target (step 405). If so, the logical 1 level current $I_1$ is decremented (step 406), provided the minimum operating limit set for that parameter $I_{1,min}$ has not previously been reached.

If the average power measurement $P_{avg}(N)$ is neither less than nor greater than the target (i.e., the average power measurement $P_{avg}(N)$ equals the target value), the extinction ratio may be presumed to have been set to an acceptable value in a previous iteration of the process such that no further adjustment is required, and the process returns to step 402. Note that this may also be the case when the average power measurement $P_{avg}(N)$ does not equal the target value, but the logical 1 level current $I_1$ cannot be adjusted (i.e., $I_1$ has already reached $I_{1,max}$ or $I_{1,min}$).

On the other hand, if the logical 1 level current $I_1$ is incremented or decremented, the modulation current $I_{mod}$ is altered to achieve (in this example) the desired extinction ratio (step 407). For this purpose, it may be noted that:

$$ER = 10 \cdot \log_{10}\left(\frac{P_1}{P_0}\right),$$

$$\Rightarrow ER = 10 \cdot \log_{10}\left(\frac{I_1(N) - I_{th}(N)}{I_1(N) - I_{mod}(N) - I_{th}(N)}\right)$$

so that, using the desired extinction ratio value and the threshold current estimate from the previous loop cycle, the modulation current may be set by:

$$I_{mod}(N) \approx (1 - 10^{-ER/10}) \cdot (I_1(N) - I_{th}(N-1)).$$

Finally, before proceeding with the next loop iteration (i.e., returning to step 402), the estimated threshold current $I_{th}$ is calculated for use in the next iteration (step 408).

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A system comprising:
 a light source capable of emitting light at a variable output power to transmit data at a given data rate;
 a monitor diode positioned to receive at least a portion of the emitted light, the monitor diode having a bandwidth only partially overlapping a lower end of a data transmission spectrum for the data rate; and
 a controller capable of determining an average output power of the light source based on an output signal of the monitor diode, comparing the average output power to a target value, and adjusting the variable output power of the light source by:
 incrementing or decrementing a logical 1 level current based on the comparison of the average output power to the target value; and
 determining a modulation current for the light source using the incremented or decremented logical 1 level current;
 wherein the average output power and at least one of an optical modulation amplitude and an extinction ratio of the light source are controlled based on values of the transmitted data contained in the emitted light.

2. The system according to claim 1, wherein the bandwidth of the monitor diode is substantially less than the data rate.

3. The system according to claim 1, wherein the bandwidth of the monitor diode is less than or equal to between one tenth and one fortieth of the data rate.

4. The system according to claim 1, wherein the monitor diode functions as a low pass filter operating on the light emitted by the light source.

5. The system according to claim 1, further comprising:
 peak detectors with decay capable of detecting a peak-to-peak amplitude of the output signal of the monitor diode, wherein the peak-to-peak amplitude is directly representative of the optical modulation amplitude for the light source.

6. The system according to claim 5, wherein the controller is capable of employing output signals from the peak detectors to control at least one of the optical modulation amplitude and the extinction ratio of the light source.

7. The system according to claim 6, wherein the system is included in an optical subassembly, the optical subassembly adapted for transmission of data over an optical transmission medium.

8. The system according to claim 7, wherein the optical subassembly is included in a computer, the computer further comprising:
a processor coupled to the controller; and
a network connection through the optical subassembly to the optical transmission medium.

9. A method comprising:
emitting light from a light source at a variable output power to transmit data at a given data rate;
receiving at least a portion of the emitted light at a monitor diode, the monitor diode having a bandwidth only partially overlapping a lower end of a data transmission spectrum for the data rate;
determining an average output power of the light source based on an output signal of the monitor diode;
comparing the average output power to a target value; and
adjusting the variable output power of the light source by:
incrementing or decrementing a logical 1 level current based on the comparison of the average output power to the target value; and
determining a modulation current for the light source using the incremented or decremented logical 1 level current;
wherein the average output power and at least one of an optical modulation amplitude and an extinction ratio of the light source are controlled based on values of the transmitted data contained in the emitted light.

10. The method according to claim 9, wherein the bandwidth of the monitor diode is substantially less than the data rate.

11. The method according to claim 9, wherein the bandwidth of the monitor diode is less than or equal to between one tenth and one fortieth of the data rate.

12. The method according to claim 9, further comprising:
low pass filtering the light emitted by the light source using the monitor diode.

13. The method according to claim 9, further comprising:
detecting peak-to-peak amplitude of the output signal of the monitor diode, wherein the peak-to-peak amplitude is directly representative of the optical modulation amplitude for the light source.

14. The method according to claim 13, further comprising:
employing the peak-to-peak amplitude for the output signal of the monitor diode to control at least one of the optical modulation amplitude and the extinction ratio of the light source.

15. A system comprising:
a signal source capable of emitting a high frequency signal to transmit data at a given data rate;
a monitor device capable of receiving at least a portion of the emitted signal, the monitor device having a bandwidth only partially overlapping a lower end of a data transmission spectrum for the data rate; and
a controller capable of determining an average output power of the signal source based on an output signal of the monitor device, comparing the average output power to a target value, and adjusting an output power of the signal source when the average output power does not equal the target value and a modulation current used to drive the signal source has not reached a maximum or minimum value;
wherein the average output power and at least one of an optical modulation amplitude and an extinction ratio of the signal source are controlled based on values of the transmitted data contained in the emitted signal.

16. The system according to claim 15, wherein the bandwidth of the monitor device is substantially less than the data rate.

17. The system according to claim 15, wherein the bandwidth of the monitor device is less than or equal to between one tenth and one fortieth of the data rate.

18. The system according to claim 15, wherein the monitor device functions as a low pass filter operating on the high frequency signal emitted by the signal source.

19. The system according to claim 15, further comprising:
peak detectors with decay capable of detecting a peak-to-peak amplitude of the output signal of the monitor device.

20. The system according to claim 19, wherein:
the signal source is a light source capable of emitting light to transmit the data at the data rate;
the monitor device is a low bandwidth monitor diode capable of receiving at least a portion of the emitted light;
the peak-to-peak amplitude detected by the peak detectors is directly representative of the optical modulation amplitude for the light source; and
the controller is capable of employing output signals from the peak detectors to control the output power of the light source.

* * * * *